United States Patent
Crate

[15] 3,637,096
[45] Dec. 25, 1972

[54] NUCLEAR FUEL TRANSFER MACHINE
[72] Inventor: John J. Crate, Wethersfield, Conn.
[73] Assignee: Combustion Engineering, Inc., Windsor, Conn.
[22] Filed: Feb. 27, 1969
[21] Appl. No.: 802,942

[52] U.S. Cl. ....................................214/18, 176/30, 214/17
[51] Int. Cl. ...........................................G21c 19/20
[58] Field of Search..................................214/17.4, 18, 18 N; 176/30–32

[56] References Cited

UNITED STATES PATENTS 3,128,963  4/1964  Erkes..............................214/17 B X
3,206,366  9/1965  Bosshard........................214/18 N X Primary Examiner—Robert G. Sheridan
Attorney—Carlton F. Bryant, Eldon H. Luther, Robert L. Olson, John F. Carney, Richard H. Berneike, Edward L. Kochey, Jr. and Lawrence P. Kessler

[57] ABSTRACT

A transfer machine for transferring fuel bundles from a reactor-handling pool to the spent fuel-handling pool through a transfer tube in the reactor containment wall. A load-supporting carriage including its own driving means operates to move horizontally along support rails from the reactor pool to the spent fuel pool. A fuel carrier adapted to receive the fuel elements is pivotally mounted on the load supporting carriage with its vertical orientation established by interaction between guide rollers mounted on the fuel carrier and guide rails. These guide rails are arranged so that the fuel carrier is in a vertical upright position in each of the pools while it is guided to a horizontal position for transfer through the transfer tube.

10 Claims, 4 Drawing Figures

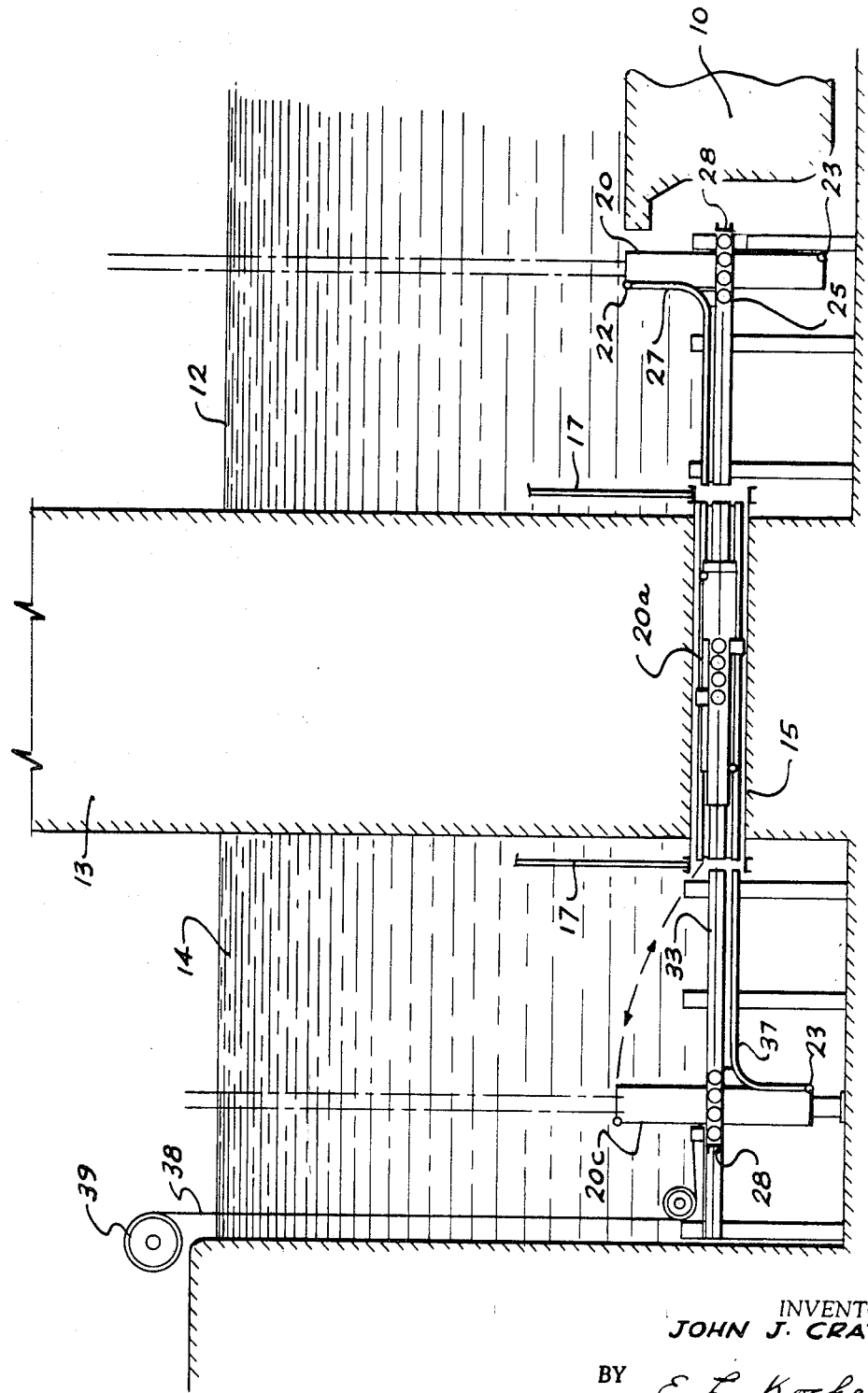

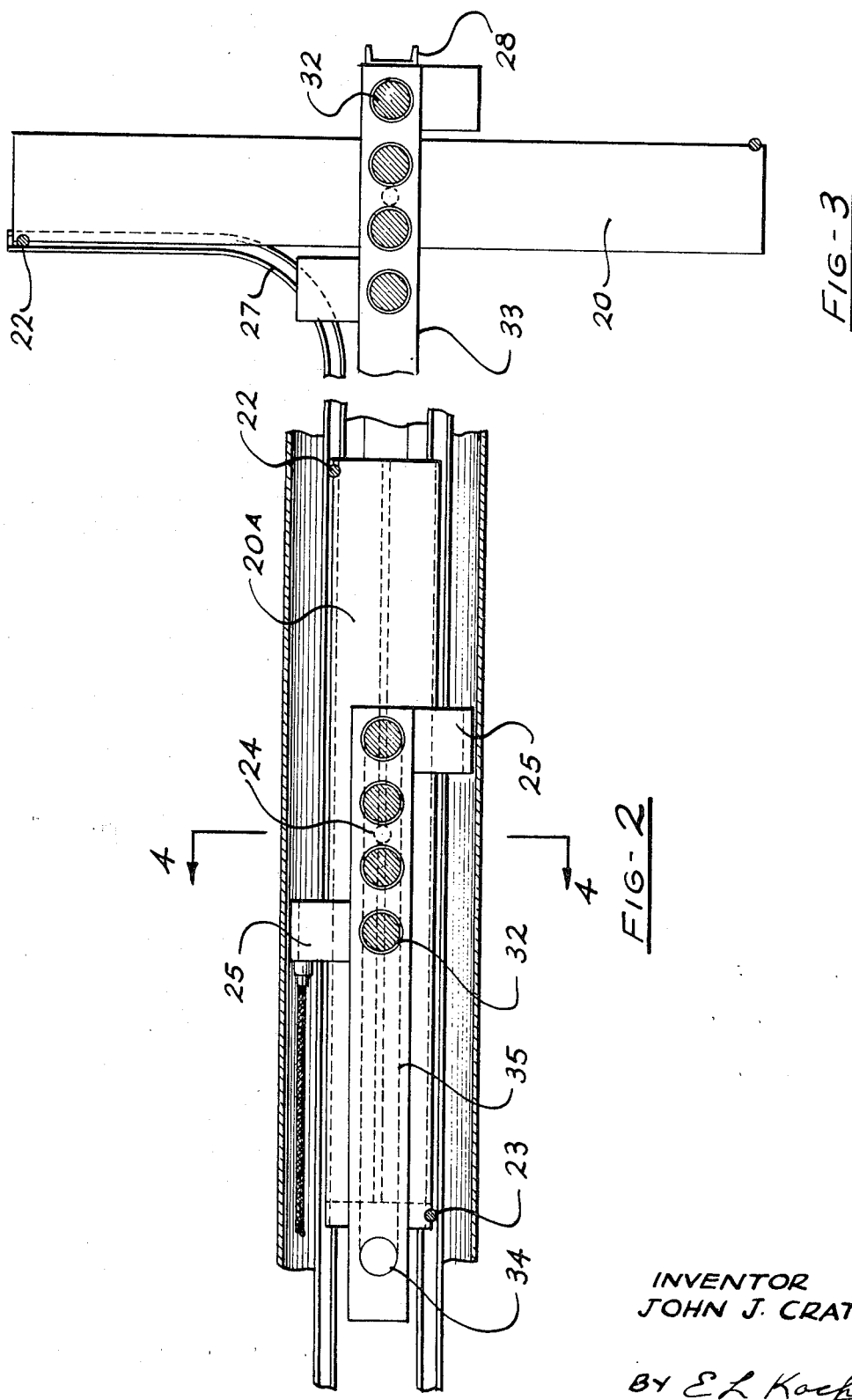

NUCLEAR FUEL TRANSFER MACHINE

BACKGROUND OF THE INVENTION

This invention relates to the transfer of nuclear fuel assemblies and in particular to a method and apparatus for transferring fuel bundles from the nuclear reactor pool to a spent fuel storage pool.

In refueling a nuclear reactor the radioactive fuel bundles must be removed from the reactor core and stored for an extended period of time in a spent fuel pool. In order to avoid the hazards due to radiation, the nuclear reactor core is flooded with water to a substantial depth above the top of the core with the fuel elements removed under water. Since these fuel elements are highly radioactive and still produce heat known as decay heat for a period of several months, they cannot be immediately removed from the plant but must be stored preferably under water which provides radiation protection and the necessary cooling.

When these spent fuel elements have sufficiently decayed, they may be removed and shipped for reprocessing. Since the nuclear reactor will be back in operation at this time, it is preferable that the spent pool be located outside of the reactor container vessel. Since the reactor containing vessel is designed to withstand relatively high pressures and to provide radiation shielding, large openings in this containment vessel are cumbersome and expensive. The elongated fuel elements are therefore longitudinally passed through openings in the reactor containment.

One approach is to locate the spent fuel pool at an elevation well below the reactor so that the elements may be lowered downwardly into the spent fuel pool. This however requires extensive excavation due to the lower elevation of this pool and increasing the amount of flooding required in order to effect an appropriate fuel transfer between the reactor pool and the spent fuel pool.

Another approach generally used is to locate the spent fuel pool along side the reactor pool. A transfer tube joins the two pools and this transfer tube is capable of being valved off by means of gate valves. Transfer of fuel between the two pools requires that the fuel assembly which is removed from the reactor be placed into a fuel carrier. A first mechanism then rotates this fuel carrier to a horizontal position. A second mechanism then engages the fuel carrier to a horizontal position. A second mechanism then engages the fuel carrier translating the fuel carrier along with the fuel assembly through the horizontal tube into the spent fuel storage pool. A third mechanism is required to rotate the fuel carrier along with the fuel assembly to the vertical position. The fuel assembly may then be lifted out of the fuel carrier and placed in storage racks within the spent fuel pool.

The prior art practice therefore requires a multiplicity of driving mechanisms along with three separate and discrete steps in transferring the fuel assembly from its position in a carrier within the reactor pool to its position within the spent fuel pool. In my invention one mechanism with a single drive performs all of these functions thereby effecting simplified operation along with less equipment to be maintained. The single drive mechanism may be located in a fuel carrier carriage thereby simplifying the operation and minimizing the space requirements, since the carrier need not be so long as to extend from one pool to the other in order to effect translation of the carriage.

SUMMARY OF THE INVENTION

My invention provides a means for transferring a fuel bundle from a reactor-handling pool through a transfer tube located in the containment structure to a spent fuel-handling pool. The conventional gate valving is used on the transfer tube. Load-supporting rails which are generally horizontal pass through the transfer tube and into the reactor and spent fuel-handling pools. An elongated fuel carrier is arranged to accept and hold fuel assemblies in the vertical position. This carrier is pivotally mounted on a fuel carrier carriage. This carriage is supported on the load-supporting rails. Guide rollers are located near the end of the fuel carrier and engage guiding rails which effect rotation of the fuel carrier in response to translation of the fuel carrier carriage.

As the fuel carrier carriage is moved along the supporting rails from the reactor pool, the interaction between the guide rail and the guide rollers causes the fuel carrier to rotate in the horizontal direction. Guide rails maintain this horizontal attitude as the assembly passes through the fuel transfer tube. On reaching the spent fuel-handling pool, guide rollers on the fuel carrier engage a guide rail which again effects rotation of the fuel carrier into the same vertical direction in response to further horizontal translation of the fuel carrier carriage.

A single-driving means effecting translation of the fuel carriage therefore also operates to rotate the fuel carrier into the proper vertical position in each of the pools. This driving means may be located on the fuel carriage itself driving wheels which ride on the load-supporting rails. The three separate drives required by the prior art devices are replaced by the single drive means thereby requiring less initial investment and minimizing maintenance problems. Furthermore, the whole operation is accomplished in one step thereby minimizing the operational manipulation which is required in handling the three discrete steps as used in the prior art. Setup for fuel transfer is simplified as compared to some arrangements where cables must be strung through the transfer tube after flooding and opening the gate valve. The carrier and carriage may be readily designed to be simply removed from this fuel-handling pool as compared to other designs which require removing bolt down tilt devices or large extension structures. Since the drive may be mounted on the fuel carriage itself neither pool size is effected by the length of transfer between pools thereby minimizing the cost of the installation.

BRIEF DESCRIPTION OF THE DRAWINGS

FIG. 1 is a side elevation showing the reactor-handling pool, the spent handling pool and the transfer mechanism;

FIG. 2 is a detailed view of the transfer mechanism shown with a fuel carrier in a horizontal position;

FIG. 3 illustrates the fuel carrier in a vertical position; and

DETAILED DESCRIPTION OF THE DRAWINGS

Figure 4:
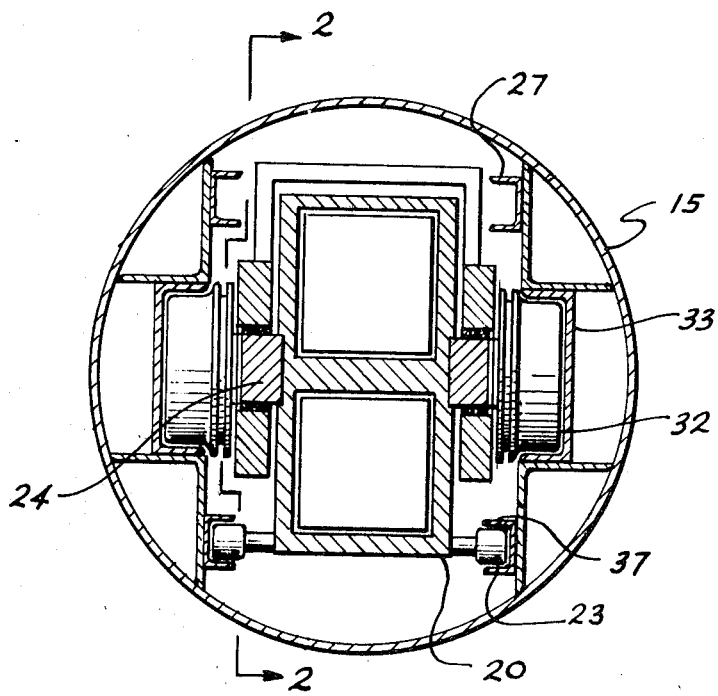
FIG. 4 is a sectional view taken through the illustration of FIG. 2.

Referring to FIG. 1, a nuclear reactor 10 is illustrated with the upper portion of the pressure vessel removed so that the reactor is in condition for refueling. The reactor handling pool 12 is flooded with water to a height about 24 feet above the top of the pressure vessel flange of the nuclear reactor which is sufficient for removing fuel elements which are 12 feet long. A conventional reactor containment wall 13 surrounds the reactor and the reactor-handling pool with a spent fuel-handling pool 14 being located at one point in the periphery of the reactor containment. This spent fuel-handling pool is filled with water to the same elevation as the reactor-handling pool.

A 3-foot-diameter transfer tube 15 passes through the reactor containment wall. Gate valve 17 is closed during normal operation of the reactor so as to maintain the integrity of the reactor containment. An elongated fuel carrier 20 is approximately rectangular in shape and has the lower end closed so that fuel elements may be placed therein and supported. The lower end should have some openings therein to permit drainage of water, if required, but should be essentially closed so as to support the weight of the fuel assemblies placed therein. The fuel carrier as illustrated is sized to accept two fuel assemblies each 12 feet long and about 8 inches square with each of these fuel assemblies weighing approximately 1,500 pounds. Conventional refueling mechanism removes the fuel assemblies from the reactor core and places them in a vertically located fuel carrier in preparation for transfer to the spent fuel-handling pool 14.

The fuel carrier 20 has an upper guide roller 22 and a lower guide roller 23. The fuel carrier is pivotally mounted by means of carrier trunnion 24 on the fuel carrier carriage 25. A guide rail 27 engages the upper guide roller 22 with stop 28 limiting the movement of the fuel carriage. This provides the positioning which maintains the fuel carrier in the upright positioning which maintains the fuel carrier in the upright position. The guide rail 27 is essentially vertical at the portion most remote from the load support rails 33 so that as the carriage 25 is moved to the left, the interaction between guide roller 22 and guide rail 37 operates to rotate the fuel carrier into the horizontal position generally as illustrated by fuel carrier 20A.

The fuel carriage includes a plurality of wheels 32 which rest on the load support rails 33. A submersible motor 34 along with appropriate gearing operates through chain transmission 35 to drive each of the wheels 32. Therefore by energizing motor 34, the carriage is translated horizontally due to the friction between the wheels 32 and the rail 33. If desired, a roughened or geared surface may be used to avoid any possibility of slipping between the wheels and the load-supporting rails.

A plurality of wheels permits the carriage to pass across the opening due to gate valve 17 since only one wheel must pass the gap at one time. The guide rail 27 is continued through the horizontal portion of the transfer tube 15 to retain the fuel carrier in approximately horizontal position. While space requirements are minimized by maintaining the fuel carrier in a completely horizontal position, a slightly higher elevation of this rail would permit some pitch to be retained during passage through the transfer tube 15.

As the carriage is moved under its own power into the spent fuel-handling pool 14, the fuel carrier is moved to a position as indicated by fuel carrier 20C. In order to accomplish this, the lower guide roller 23 engages guide rail 37 which is also essentially vertical at a location remote from the load-supporting rail 33. While it is desirable to maintain the guidance of the carrier tube throughout its horizontal movement by means of engaging both guide rails throughout the transfer tube, it is only essential that the rotating movement be limited in some manner and that at least one guide rail engage the guide roller when the assembly emerges from the transfer tube.

After the fuel carrier reaches its vertical position in the spent fuel-handling pool, conventional hoisting equipment removes the spent fuel elements from the fuel carrier and places them for storage in spent fuel storage racks (not shown). A reversal of the operation driving the carriage back to the reactor-handling pool prepares the apparatus for accepting another pair of fuel assemblies for transfer to the spent fuel-handling pool. Use of a direct current motor 34 permits simplified operation since the direction of rotation may be easily reversed. As illustrated, the power supply to this motor passes through cable 38 from a power supply and retrieval reel 39 to the motor 34. This cable provides a means for retrieving the mechanism should a power failure occur so that the mechanism may be withdrawn to the spent fuel-handling pool where maintenance work may be accomplished in relative safety.

By use of the motor drive on the carriage itself, the reactor-handling pool need be approximately only 14 feet long to allow for the 12-foot fuel element in addition to about a 2-foot clearance for transfer to the vertical position. While the same approach using guide rails to rotate the carrier can be used without the integral motor, this would require a much longer carriage since it would have to be physically moved in both directions by a cable in the reactor-handling pool. This would require sufficient length or extension of the carriage to reach into the reactor-handling pool when the fuel carrier is in the vertical position in the spent fuel-handling pool. This, in turn, would require a substantially increased length of the reactor-handling pool. Alternately the spent fuel-handling pool must be longer if the carriage is driven therefrom. As the transfer tube length increases, so does the pool length to accommodate the extension. With my invention, only the cable reel component changes, when the drive motor is located on the carriage.

While I have illustrated an embodiment wherein two fuel assemblies are simultaneously moved, the apparatus can be used for handling one assembly at a time or any reasonable number. Due to the physical arrangement and the use of a cylindrical transfer tube, handling of two assemblies at one time is reasonable since considerable vertical space is available in passage through the tube while a large portion of the horizontal space is used due to the requirement for the trunnion bearings and the drive wheels. The fuel carrier 20 should be located in the carriage 25 so that it is pivotally mounted at the center of gravity of a loaded fuel carrier. This minimizes the forces required between the guide rollers and the guide rails to effect rotation of the fuel carrier during operation.

While I have illustrated and described a preferred embodiment of my invention, it is to be understood that such is merely illustrative and not restrictive and that variations and modifications may be made therein without departing from the spirit and scope of the invention. I, therefore, do not wish to be limited to the precise details set forth but desire to avail myself of such changes as fall within the purview of my invention.

What I claim is:

1. A nuclear fuel transfer machine for transferring fuel bundles through a fuel transfer tube in a reactor containment wall from a reactor-handling pool to a spent fuel-handling pool comprising generally horizontal load-supporting rails passing through said transfer tube into said reactor and spent fuel-handling pools; an elongated fuel carrier having lateral supporting means and retaining means at an effectively closed end thereof; at least one guide roller located near an end of said fuel carrier and affixed thereto; a fuel carrier carriage pivotally supporting said fuel carrier, and including a plurality of wheels arranged to rest on said load-supporting rails; driving means for effecting translation of said fuel carriage along said supporting rails; and guide rail means arranged to engage said guide roller, said guide rail means extending from a location near said load-supporting rails to a location vertically remote from said load-supporting rails in said reactor-handling pool and in said spent fuel-handling pool.

2. An apparatus as in claim 1 having two guide rollers, one of said guide rollers located near the closed end of said fuel carrier and the second of said guide rollers located near the other open end of said fuel carrier.

3. An apparatus as in claim 2 wherein said guide rail means comprises a first guide rail engaging said first roller in one of said pools and arranged to raise said guide roller substantially above the load-supporting rails; and a second guide rail in the other of said pools engaging the second of said guide rollers and arranged move said second guide roller vertically downward from said load-supporting rails.

4. An apparatus as in claim 1 wherein the guide rail in each of said pools is generally vertical at the location most remote from said support rail.

5. An apparatus as in claim 2 wherein the guide rail in each of said pools is generally vertical at the location most remote from said support rail.

6. An apparatus as in claim 3 wherein the guide rail in each of said pools is generally vertical at the location most remote from said support rail.

7. An apparatus as in claim 3 wherein said driving means comprises a submersible motor located on said carriage and means for driving said wheels by said motor.

8. An apparatus as in claim 1 wherein said fuel carrier is pivotally mounted on said fuel carrier carriage at the center of gravity of said fuel carrier when said fuel carrier is loaded with a fuel bundle.

9. An apparatus as in claim 3 wherein said fuel carrier is pivotally mounted on said fuel carrier carriage at the center of gravity of said fuel carrier when said fuel carrier is loaded with a fuel bundle.

10. An apparatus as in claim 7 wherein said fuel carrier is pivotally mounted on said fuel carrier carriage at the center of gravity of said fuel carrier when said fuel carrier is loaded with a fuel bundle.

* * * * *

PO-1050
(5/69)

UNITED STATES PATENT OFFICE
CERTIFICATE OF CORRECTION

Patent No. 3,637,096　　　　　　　　　　Dated January 25, 1972

Inventor(s) John J. Crate

It is certified that error appears in the above-identified patent and that said Letters Patent are hereby corrected as shown below:

Issue date should be changed from "December 25, 1972" to
-- January 25, 1972 --;

Column 1, lines 43-45, of the patent, delete "A second mechanism then engages the fuel carrier to a horizontal position.";

Column 3, line 6, of the patent, delete "which maintains the fuel carrier in the upright positioning";

Column 3, line 11, of the patent, change "37" to -- 27 --.

Signed and sealed this 9th day of January 1973.

(SEAL)
Attest:

EDWARD M. FLETCHER, JR.　　　　　　ROBERT GOTTSCHALK
Attesting Officer　　　　　　　　　Commissioner of Patents